United States Patent
Van Der Plas et al.

(10) Patent No.: US 8,625,187 B2
(45) Date of Patent: Jan. 7, 2014

(54) HOLOGRAPHIC VISUALIZATION SYSTEM COMPRISING A HIGH DATA REFRESH RATE DND DRIVER ARRAY

(75) Inventors: Geert Van Der Plas, Leuven (BE); Stefan Cosemans, Mol (BE)

(73) Assignee: IMEC, Leuven (BE)

(*) Notice: Subject to any disclaimer, the term of this patent is extended or adjusted under 35 U.S.C. 154(b) by 183 days.

(21) Appl. No.: 13/298,231

(22) Filed: Nov. 16, 2011

(65) Prior Publication Data
US 2012/0127559 A1 May 24, 2012

Related U.S. Application Data

(60) Provisional application No. 61/414,371, filed on Nov. 16, 2010.

(51) Int. Cl.
*G02B 26/00* (2006.01)
*G09G 3/20* (2006.01)

(52) U.S. Cl.
USPC ........... 359/291; 359/290; 359/298; 359/237; 345/55; 345/84

(58) Field of Classification Search
USPC .................. 359/290–295, 298, 245, 237, 238, 359/221.1, 221.2, 846, 850; 345/6, 32, 55, 345/84, 89; 348/135, 187, E9.027, 757, 348/771; 356/237.1; 250/458.1; 355/53; 29/829; 977/932
See application file for complete search history.

(56) References Cited

U.S. PATENT DOCUMENTS

| | | | | |
|---|---|---|---|---|
| 6,690,608 B2* | 2/2004 | Nii et al. | ..................... | 365/210.1 |
| 6,809,851 B1* | 10/2004 | Gurcan | ......................... | 359/290 |
| 6,940,629 B2* | 9/2005 | Gurcan | ......................... | 359/290 |
| 7,969,384 B2* | 6/2011 | Arai et al. | ........................ | 345/32 |
| 7,982,690 B2* | 7/2011 | Arai et al. | ........................ | 345/32 |
| 7,990,339 B2* | 8/2011 | Arai et al. | ........................ | 345/32 |
| 8,125,407 B2* | 2/2012 | Arai et al. | ........................ | 345/32 |
| 2002/0126364 A1 | 9/2002 | Miles | | |
| 2003/0058203 A1 | 3/2003 | Ahn et al. | | |

FOREIGN PATENT DOCUMENTS

GB   2452360   3/2009

OTHER PUBLICATIONS

Extended European Search Report for European Patent Application No. 11189298.0-2205 dated Feb. 21, 2012.

\* cited by examiner

*Primary Examiner* — Loha Ben
(74) *Attorney, Agent, or Firm* — Knobbe Martens Olson & Bear LLP

(57) ABSTRACT

A DND chip is disclosed. In one aspect, the chip includes a 2D DND array of DND elements logically arranged in rows and columns, and a DND driver architecture for actuating the DND elements. The DND driver has a set of first drive lines along the rows and a set of second drive lines along the columns, a set of first line drivers for each biasing one line from the set of first drive lines and a set of second line drivers for each biasing a line from the set of second drive lines. A plurality of second line drivers are spatially grouped together to serve a block of DND elements, and that plurality of second line drivers are spatially covered substantially completely by at least some DND elements of the block of DND elements. A holographic visualization system including the DND chip is provided.

20 Claims, 12 Drawing Sheets

HOLOGRAPHIC VISUALIZATION SYSTEM COMPRISING A HIGH DATA REFRESH RATE DND DRIVER ARRAY

CROSS REFERENCE TO RELATED APPLICATIONS

This application claims priority under 35 U.S.C. §119(e) to U.S. provisional patent application 61/414,371 filed on Nov. 16, 2010, which application is hereby incorporated by reference in its entirety.

FIELD OF THE INVENTION

The disclosed technology relates to projection systems, for example, holographic projection systems and projection systems comprising movable nano-electromechanical devices for modulating light waves.

DESCRIPTION OF THE RELATED TECHNOLOGY

Holographic projection systems containing an array of individually controllable electro-mechanically movable nano-mirrors, i.e. a so-called nano electro-mechanical system (NEMS), for modulating a light wave front are known. When illuminated by visible light capable of generating interference and coded with sequences of video holograms, the array of nano-mirrors can holographically reconstruct the optical appearance of coded three-dimensional scenes. Light waves diffracted at one nano-mirror will spread out in all directions and interfere with light waves diffracted at other nano-mirrors. Such systems use a holographic video device in real time or at least near real time. Because in the micro-mechanical system the electronic controllers and the modulator cells are all integrated on one chip, the diagonal of the active surface area of the light modulator generally measures up to a few centimeters only. The real time requirement puts stringent requirements on the resolution and speed of the light modulator in order to be able to realize holographic reconstructions with high resolution, brightness and contrast while keeping spatial and temporal cross-talk within acceptable limits. Preferably the projection systems must be able to present the three-dimensional scene to one or more observers at a sufficiently large viewing angle.

The main element of a holographic 3D visualization system is its electro-mechanical integrated system. This system is a two-dimensional (2D) array of closely packed individually programmable diffractive optical nano-electro-mechanical devices (DNDs) and the corresponding matrix of driver/programming circuits. Each DND comprises a movable optically reflective nano-mirror for reflecting an incoming light wave, a mechanical spring allowing the nano-mirror to move and at least two electrodes for actuating the nano-mirror. These electrodes are biased via the corresponding driver circuit in order to actuate the desired movement of the nano-mirror. FIG. 1 shows a prior art schematic layout of a 2D array 10 of nano-mirrors (DND) 11 with horizontal (select) scan-lines 12 and parallel vertical (write) bit-lines 13 allowing individual actuation of each nano-mirror 11, illustrated by squares in FIG. 1. The DND pitch is P.

Holography is based on diffraction of a reference monochromatic coherent light beam such as a laser on the holographic plate, which here is the 2D array of movable nano-mirrors 11, and the resulting interference of the light waves diffracted at this holographic plate. This interference recreates the original light field, i.e. the 3D scene. Projection angles are inversely proportional to the pitch P of the nano-mirrors 11 in the 2D array 10. The projection angle is the range of angles at which a viewer looking to the 3D scene still experiences the holographic view. A projection angle of 60° requires a pitch of one wavelength ($1\lambda$) of the used laser light ($\lambda_{RED}$=650 nm, $\lambda_{GREEN}$=510 nm, $\lambda_{BLUE}$=475 nm). So an average nano-mirror pitch for a 60° projection or viewing angle system is approximately 500 nm. Similarly, a $2\lambda$ pitch corresponds to 30° system, or a $0.5\lambda$ pitch corresponds to 120° system, etc. based on elementary physics of diffraction. To achieve, for example, a 30° projection angle in such a visualization system, a pitch P of 1 µm is required in x and y directions. Without additional optical device a 2D array of 20.000×20.000 DNDs with 1 µm pitch results in a 20 mm×20 mm display with a projection angle of 30°. A typical way to achieve a RGB-color visualization is to reprogram such a 400M (20.000×20.000) DND array three times every frame of a video sequence. A typical video sequence contains 25 frames per second, resulting in a 30 Gbps data rate (30 G bit/s=20.000*20.000*3*25/s).

A larger optical scene can be created by manufacturing larger chips having a greater number of DNDs. This, however, considerably reduces semiconductor manufacturing yield. Another way to create an optically larger scene is by optically tiling, i.e. time multiplexing, the 20 mm×20 mm chip over a larger area. This is achieved by consecutively redirecting the optical output of the physical chip towards different regions of a larger display area. For each optical tile, the physical chip is reprogrammed in order to create the corresponding part of the overall scene. A modest 5×5 optical tiling will create a display module of 100 mm×100 mm thereby requiring a 25-times higher data throughput. Whereas a single tile requires a data rate of 30 Gpbs, a system with a 5×5 optical tiling requires a data rate of 750 Gbps data rate (=30 Gpbs*25). Solutions exist to achieve even these kinds of data rates on the I/O pins of such a chip. Assuming that all 25 optical tiles are refreshed at a rate of 25 Hz in a RGB color visualization, all the DNDs in the 2D array must be reprogrammed at a rate of 1875 Hz (=25*3*25/s), which is a major challenge.

A typical DND can be reliably actuated in a time period "T_actuation" of 1 µs to 10 µs, corresponding to a refresh rate of respectively 1 MHz to 100 kHz. Using a state-of-the-art row/column programming schemes, this required actuation refresh time "T_actuation" results in a maximum system refresh rate of 5 to 50 Hz. In such a programming scheme as shown in FIG. 1, a set of 20 k parallel bit-lines programs a complete row of 20 k DNDs in parallel, whereby the row is selected by a scan-line, at the DND refresh rate of 1 MHz. This means that the 2D DND array refresh takes=0.02 s (20.000 (number of successive scans or number of row lines)×1 µs ("T_actuation"), corresponding to a maximum system refresh rate of 50 Hz.

To summarize, a typical DND-based holographic visualization system contains millions of individually programmable sub-micron, i.e. nano-meter scale, DND devices arranged in a 2D array. While semiconductor-chip processing limits the total area of such displays to a few square centimeters, optical tiling can be used to create larger display modules. The main constraint in such optically-tiled holographic systems is the limiting rate of DND reprogramming, typically 100 kHz-1 Mhz. State-of-the-art programming schemes only achieve 50 Hz system refresh rate which is far from sufficient for optical tiling. For example, a 5×5 optical-tiling system requires a refresh rate of 1875 Hz.

SUMMARY OF CERTAIN INVENTIVE ASPECTS

Certain inventive aspects relate to a DND driver architecture achieving a system refresh rate which is above about 50 Hz, for example above about 100 Hz, such as above about 500 Hz, even above about 1 kHz.

In a first aspect, there is a DND chip comprising a 2D DND array of DND elements logically arranged in rows and columns, and a DND driver architecture for actuating the DND elements, the DND driver architecture comprising a set of first drive lines along the rows of DND elements and a set of second drive lines along the columns of DND elements; a set of first line drivers for each biasing one line from the set of first drive lines and a set of second line drivers for each biasing a line from the set of second drive lines. A plurality of second line drivers are spatially grouped together to serve a block of DND elements, and that plurality of second line drivers are spatially covered substantially completely by at least some DND elements of the block of DND elements.

In a DND chip according to one inventive aspect, a second line driver may have a width of N DND elements and a height of M DND elements, N second line drivers being grouped together to serve a block of N×(N×M) DND elements. This represents the smallest block with full programmability.

In a DND chip according to one inventive aspect, a plurality of blocks of DND elements each covering the plurality of second line drivers serving the DNDs of their block are arranged adjacent one another in row direction. A plurality of blocks arranged adjacent one another may be grouped together for all being served by a same plurality of first line drivers. Such blocks arranged adjacent one another and served by plurality of first lines and their line drivers form a segment. In a DND chip according to one inventive aspect, first drive lines may be arranged for driving all DND elements on a row of the array. In a DND chip according to one inventive aspect, at least two first drive lines may be arranged for each driving a different set of DND elements on a row. This way, the first drive lines are split, which provides a reduced time constant.

In a DND chip according to one inventive aspect, a plurality of the first line drivers may be spatially grouped together to serve a block of DND elements, and that plurality of first line drivers may be spatially covered substantially completely by at least some of the DND elements of the block of DND elements. In this embodiment, scan line drivers are also covered by DND elements. The first line drivers and the second line drivers together may be covered by all DNDs they serve This way, all DNDs can be served by the circuit underneath and yet 100% fill factor can be obtained; there are no missing rows and/or columns.

A DND chip according to one inventive aspect may furthermore comprise additional routing resources to connect the first line drivers to the first drive lines and/or to connect the second line drivers to the second drive lines.

The first line drivers and the second line drivers may be placed in a checkerboard pattern underneath the DNDs they serve.

In a DND chip according to one inventive aspect, the DND elements mat have width and height dimensions not larger than about 1 μm; they may be nano-mirrors.

In a second aspect, there is a holographic visualization system comprising a DND chip.

Particular and preferred aspects of the invention are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other inventive aspects will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
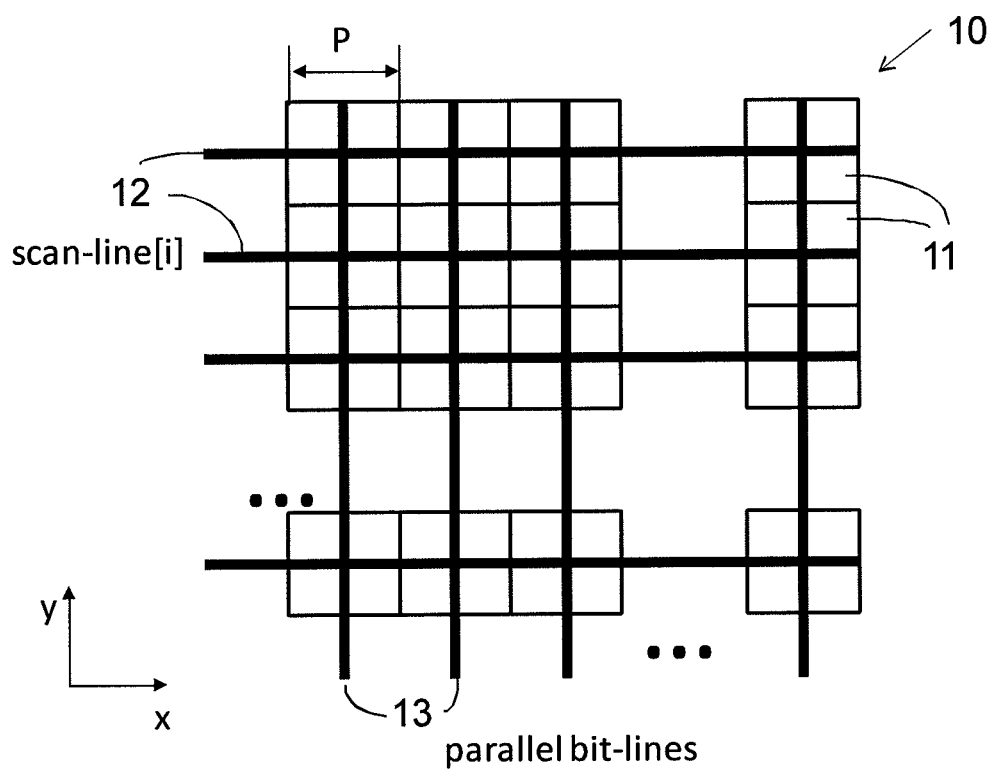
FIG. 1 schematically illustrates a prior art 2D array of DND elements actuated by a driver architecture comprising scan lines and pixel lines, where scan line drivers and pixel line drivers (both not illustrated) are placed at the edges of the 2D array and require a substantial amount of chip area.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF CERTAIN ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present description, DND relates to a digital nanomirror device. A DND chip has on its surface several hundred thousands of DND elements, which are microscopic mirrors of nanometer dimensions (e.g. not larger than about 1 µm in length and width, such as between about 400 and 800 nm across), arranged in an array. Each mirror corresponds to a pixel in an image to be displayed. The nanomirrors can be individually moved, e.g. rotated, to an on or an off state. In the on state, light from a light source is reflected into a lens making the pixel appear bright on a projection surface. In the off state, the light is directed elsewhere (usually onto a heat sink), making the pixel appear dark.

In the context of the present description, the DND elements, e.g. nanomirrors, are made out of optically reflective material, such as for example aluminium. The DND elements, e.g. nanomirrors, are provided with a mechanical spring allowing them to move. At least two electrodes are provided for actuating each DND element. These electrodes are biased via corresponding driver circuits.

With "light" is meant electromagnetic radiation with a wavelength between about 390 and 750 nm, for example between about 420 and 650 nm, i.e. visible light.

In a first aspect, there is a DND chip, comprising a plurality of nanomirrors (DND elements) arranged in a 2D DND array, the nanomirrors being logically organized in rows and columns. Throughout this description, the terms "horizontal" and "vertical" (related to the terms "row" and "column", respectively) are used to provide a co-ordinate system and for ease of explanation only. They do not need to, but may, refer to an actual physical direction of the device. Furthermore, the terms "column" and "row" are used to describe sets of array elements (nanomirrors) which are linked together. The linking can be in the form of a Cartesian array of rows and columns; however, the present invention is not limited thereto. As will be understood by those skilled in the art, columns and rows can be easily interchanged and it is intended in this disclosure that these terms be interchangeable. Also, non-Cartesian arrays may be constructed and are included within the scope of the invention. Accordingly the terms "row" and "column" should be interpreted widely. To facilitate in this wide interpretation, the claims refer to logically organized in rows and columns. By this is meant that sets of memory elements are linked together in a topologically linear intersecting manner; however, that the physical or topographical arrangement need not be so. For example, the rows may be circles and the columns radii of these circles and the circles and radii are described in this description as "logically organized" rows and columns. Also, specific names of the various lines, e.g. scan line and pixel line, are intended to be generic names used to facilitate the explanation and to refer to a particular function. This specific choice of words is not intended to in any way limit the invention. It should be understood that all these terms are used only to facilitate a better understanding of the specific structure being described, and are in no way intended to limit the invention.

A DND chip according to one embodiment also comprises a DND driver architecture for actuating the DND elements, i.e. nanomirrors. The DND driver architecture comprises a set of first drive lines, e.g. scan lines, along the rows of DND elements, and a set of second drive lines, e.g. pixel lines, along the columns of DND elements in the array. Each of the first and second drive lines are arranged for being driven by line drivers. Hence a set of first line drivers are provided for each biasing one of the lines of the set of first drive lines, and a set of second line drivers are provided for each biasing one of the lines of the set of second drive lines. A DND element in the array can be actuated, i.e. its orientation can be changed, when both the first drive line, e.g. scan line, of the row onto which the DND is positioned, and the second drive line, e.g. pixel line, of the column onto which the DND is positioned, are biased by means of the corresponding first and second line drivers.

In one embodiment, a segmented DND driver architecture is disclosed, allowing substantially increased system refresh rates, in particular for example for a large-size DND-based optically tiled holographic visualization system. In one embodiment, a large-size system may be a system of at least about 100M pixels, typically for example about tens of giga pixels. In addition such driver architecture allows having a closely packed 2D DND array, i.e. without interrupting the 2D DND array. The driver architecture disclosed offers a reduction in chip area required for a given 2D array, i.e. for a 2D array of a given number of nanomirrors. This driver architecture also offers an increased reliability.

In such a 2D array according to one embodiment, each nanomirror corresponds to a pixel and can be individually addressed by selecting the combination of a DND row (using a first drive line, e.g. scan line) and a DND column (using a second drive line, e.g. pixel line). Each column is biased by a second line driver, e.g. pixel line driver (PLD), whereas each row is biased by a first line driver, e.g. scan line driver (SLD). In the following, the terms "scan line", "scan line driver", "pixel line" and "pixel line driver" are used, without, however, being intended to limit the present invention. These terms can be replaced by the more general "first drive line", "first line driver", "second drive line" and "second line driver".

As explained above, during programming all nanomirrors in a row will be programmed in parallel when their column is selected via the corresponding pixel line driver. By sequentially selecting the different rows via the corresponding scan line drivers, the complete 2D array can be programmed. These pixel line drives and scan line drivers are typically placed at the edges of the 2D array and require a substantial amount of chip area.

Contrary thereto, and in accordance with one embodiment, a plurality of second line drivers, e.g. pixel line drivers, may be spatially grouped together to serve a block of DND elements. In accordance with one embodiment, that plurality of second line drivers are spatially covered substantially completely, preferably completely, by at least some DND elements of the block of DND elements they serve.

Figure 2:
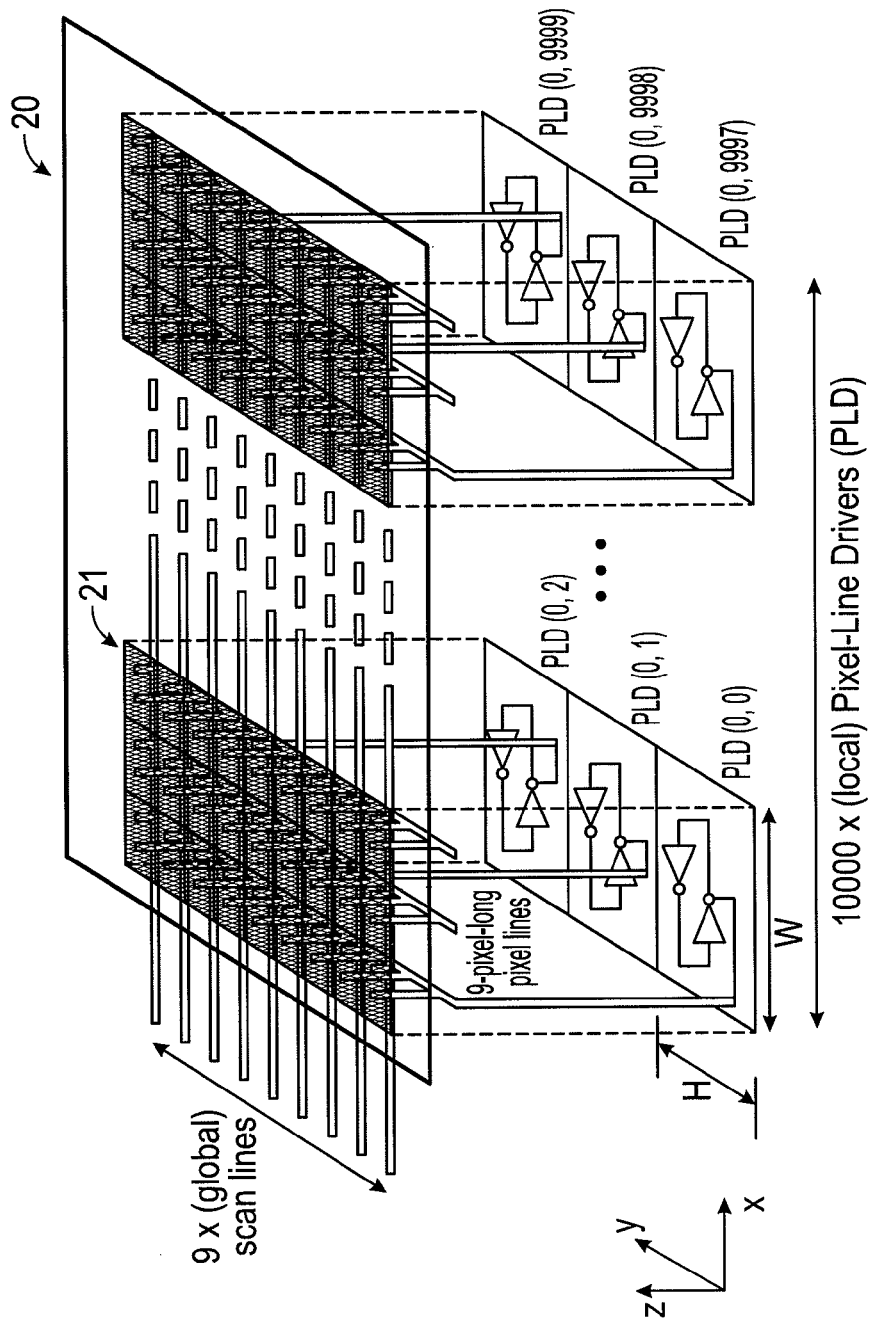
FIG. 2 illustrates a 2D array of DND elements in accordance with one embodiment, where a plurality of pixel line drivers are grouped together, this group of pixel line drivers being physically accommodated underneath the DND elements they serve.

This is, as an example only, illustrated in FIG. 2. The 2D array of DND elements is partitioned into segments 20, each segment 20 comprising at least one fully programmable block 21 of DND elements. FIG. 2 illustrates a single segment 20, comprising a plurality of blocks 21, two of such blocks 21 being illustrated in more detail. In the embodiment illustrated, a block 21 comprises 3×9 DND elements. This number is related to the size of the second line drivers as explained below, and is not intended to be limiting for the present invention. A plurality of blocks 21 are arranged adjacent one another and are served by a same set of first drive lines. All blocks 21 grouped together and served by the same set of first drive lines form a segment 20.

FIG. 2 also shows in more detail a schematic of a single block 21 of a 2D DND array. In each block 21, the pixel line drivers (PLD [i,j]) for biasing the DNDs in this block are placed underneath the DNDs of the block, whereby i is the block index and j is the column index. The minimal size of a block 21 is determined by the ratio between the area $A_{PLD}$ of a Pixel-Line Driver (PLD), and the area $A_{DND}$ taken by a single DND. In the example illustrated by FIG. 2 and FIG. 3 it is assumed that a PLD needs 3×3=9 times the area of a DND: $A_{PLD}=3\times 3\ A_{DND}$.

A typical area $A_{PLD}$ for a PLD (FIG. 3—Layer 0) circuit manufactured in existing semiconductor technologies is approximately 3 μm×3 μm, whereas in this example a pixel area $A_{DND}$ will be approximately 1×1 μm. The size of 1×1 μm is only selected for settling the mind; typical sizes of nanomirrors used in accordance with one embodiment will be about 500 nm×500 nm. But the above assumption of $A_{DND}=1\times 1\ \mu m^2$ means that a group of at least 3×3 1 μm² DNDs is needed to "cover" the area taken by a single PLD. This single PLD can only drive the DNDs arranged to be driven by a single second drive line, e.g. the DNDs in a single column. In order to drive the DNDs in the other two columns, two additional PLDs are needed. In the example given, at least three PLDs are needed to obtain a block with full programmability, where each DND has its scan line SL and pixel line PL. These three PLDs take a total area of 3×(3×3) DND pixels, each PLD driving one column that consists of nine DND pixels. Whereas the minimal width of such a block is determined by the width W of a single PLD, the minimal height H of this block (and of the corresponding segment) is determined by both the number of DNDs needed to cover this width of the single PLD and the height of a single PLD. For each additional DND column along the x-axis, an additional PLD is to be added to the block 21 in order to drive this additional DND column.

To achieve full programmability of this block of 9×3 DNDs, a set of 9 scan-line drivers (SLDs) is needed. Each scan line driver is arranged for driving one of the rows in the block. Hence the minimal number of scan lines and SLDs in a block 21 is dependent on (i) the number of PDLs stacked in a block 21, which corresponds to the number of DNDs along the width W of a PLD and (ii) on the number of DNDs along the height H of a PDL. This way the area underneath the 2D DND block can be fully utilized by the local PLDs.

Figure 3:
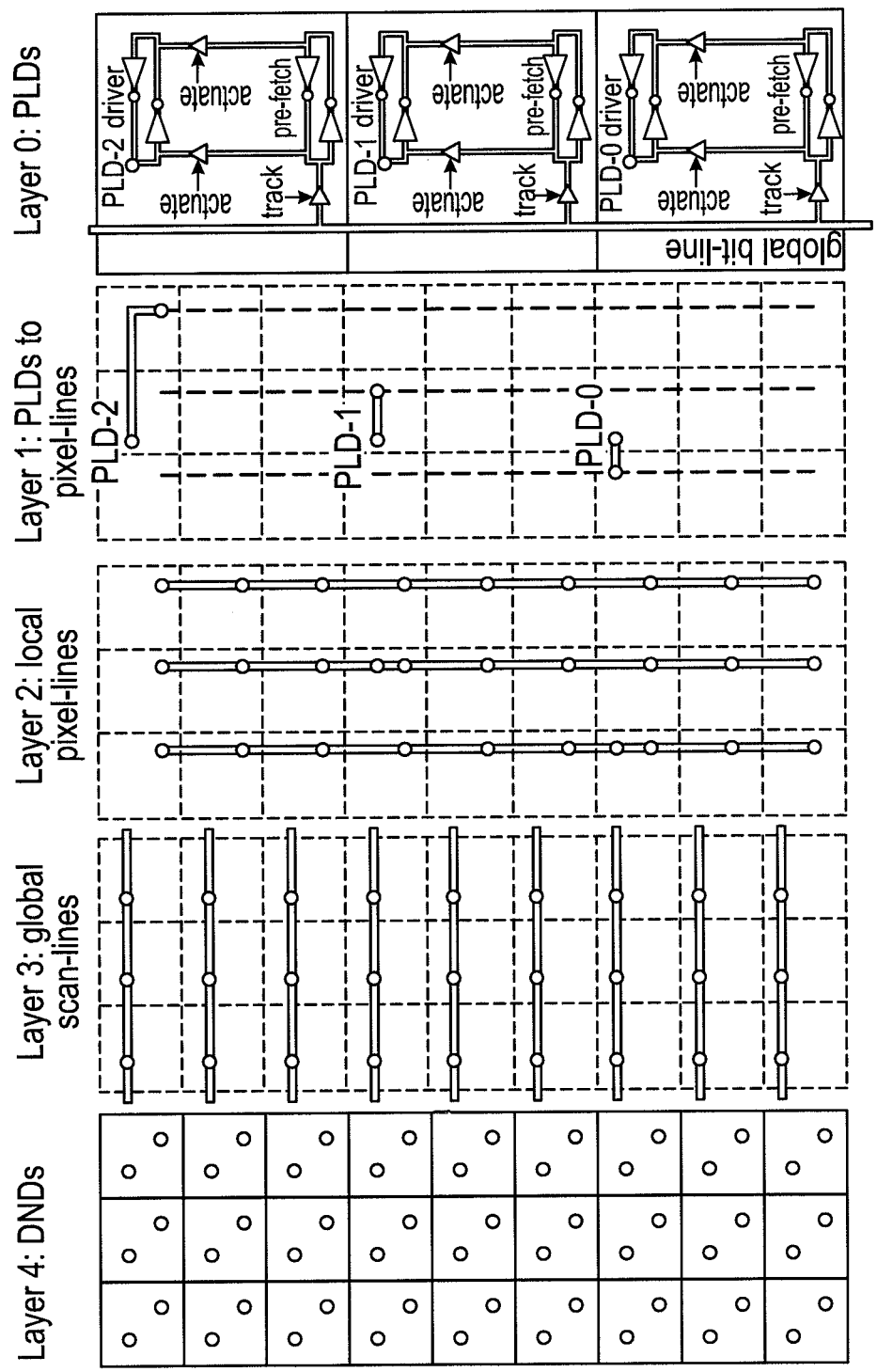
FIG. 3 illustrates different layers in a block in accordance with one embodiment, such block comprising a layer of DND elements, a layer of scan lines, a layer of local pixel lines, a connection layer connecting local pixel lines to pixel line drivers, and a layer of pixel line drivers.

FIG. 3 illustrates the electrical connection between the pixels in one block 21 with full programmability of a segment 20, as illustrated by FIG. 2, in particular the electrodes actuating the nano-mirror of each pixel, the PLD and scan lines. Layer 0 corresponds to the level where the electronic circuitry including the PLD s are located. Layer 1 shows the connection of a PLD to the corresponding local pixel lines (LPL). These local pixel lines connect a PLD to all DNDs in the corresponding column driven by this PLD. As the PLD only needs to drive the limited number of pixels within a block column, in the example illustrated nine pixels, a smaller time delay and lower energy consumption is achieved compared to prior art arrays. Moreover, an additional advantage is that if a column in such a block would fail, either by failure of the PLD, an interrupt in the LPL or by failure of a DND, this failure will only affect to a limited extent the holographic scene. The DNDs along the corresponding column in the other segments will not be affected by this local failure. Hence, the reliability of such segmented 2D DND array is increased. The LPL layout is shown in layer 2. In this example three parallel LPLs are present, each LPL connecting the nine DNDs in a single column of the block 21. Layer 3 shows the global scan lines (GSL), each GSL connecting all DNDs in a row. These GSL will extend over the full width of the segment 20, which can optionally be the full width of the array, but in accordance with one embodiment can be only part of the width of the array, and run over all the blocks 21 within this segment 20. In the example illustrated, nine DNDs are stacked in one column, requiring nine GSL to drive the corresponding 9 rows of DNDs. In layer 4, the top layer, the surface of the nano-mirror is shown representative of the pixel (square). For each pixel the connection to respectively the GSL (upper left circle) and the LPL (lower right circle) are schematically indicated.

In the foregoing, the minimal achievable size of a fully programmable block 21 was illustrated. The length of the LPL in such a block determines the maximum available segmentation (or minimal block height) that can be achieved by PLDs. One can of course stack more DNDs in a column than needed to cover, in this y-direction, all the PLDs. Hence, in accordance with one embodiment, the pixel line drivers are spatially covered substantially completely, e.g. completely, by at least some DND elements of the block 21 of DND elements. The more DNDs are stacked in a column, on top of the ones needed to substantially completely cover the PLDs, the lower the obtained segmentation. In the considered case of a 2D DND array of 20.000 columns×20.000 rows, with sizes of DNDs and PLDs as given above, the maximum segmentation is 2222 segments (20.000 rows/9 DNDs per LPL). Each segment contains 20.000 PLDs, one PLD per DND column. The refresh rate of the segmented DND array can be increased with this number of segments S, as S times more DNDs can be actuated in parallel by activating one scan line in each segment. This reduces the number of sequential DND actuation phases needed to update the full matrix with a factor S. Instead of the 50 Hz system refresh rate (=1/(20.000 sequential actuation phases×"T_actuation")) in the prior art un-segmented 2D DND array, a refresh rate of more than 100 kHz is achievable, more exactly 111.1 kHz (=1/(20.000/S sequential actuation phases×"T_actuation"))=1/*((20.000/2222)× "T_actuation")).

The teaching provided by the previous example can be generalized.

Figure 4:
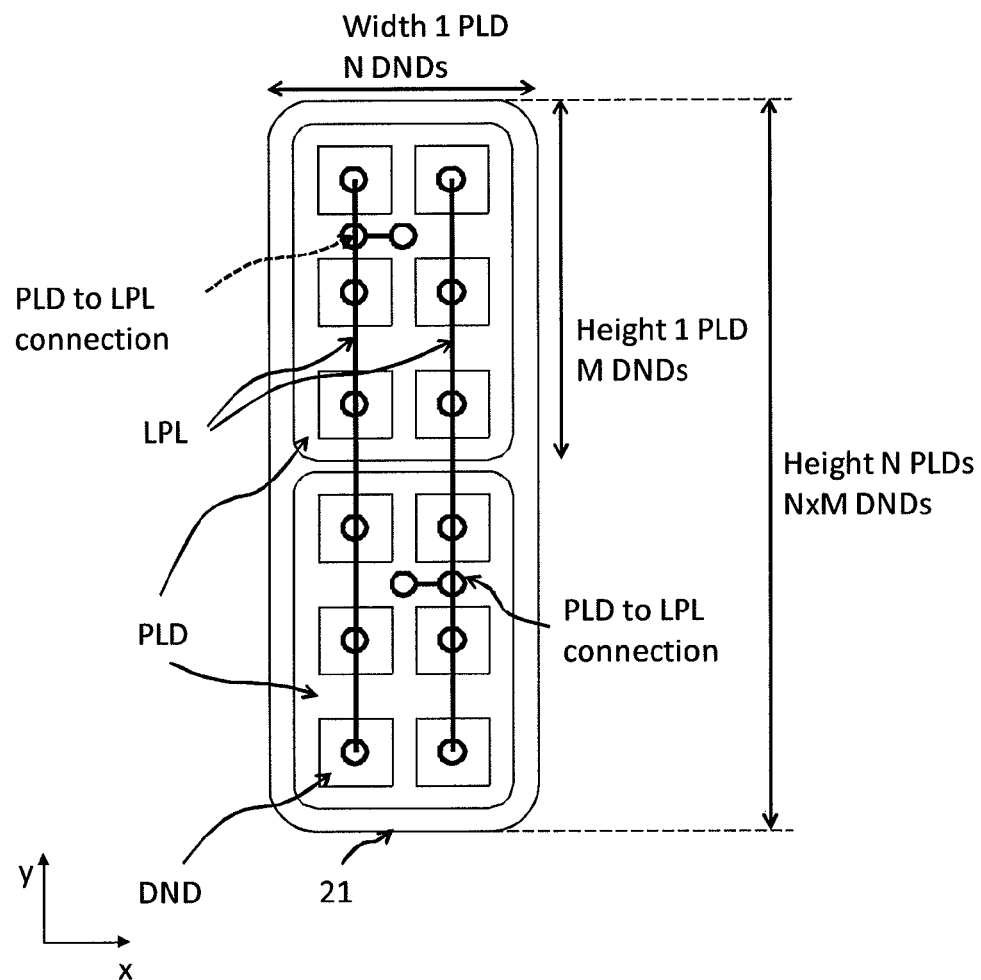
FIG. 4 illustrates a fully programmable block in accordance with one embodiment, where a group of pixel line drivers fit underneath a number of DND elements they serve.

FIG. 4 shows the smallest section 21 in a segmented array according to one embodiment, having full programmability functionality. To enable full programmability for such a block 21, each LPL needs its own PLD. A LPL is the vertical line, whereby each dot in the center of a DND indicates a connection between this LPL and this DND. Each LPL and its associated pixel line driver serve one column of DNDs. If one PLD fits underneath an area covered by N DND columns by M DND rows, i.e. the area of the PLD is covered by N×M DNDs, the smallest block 21 with full programmability contains N LPLs and hence needs N PLDs, which have to be stacked in the vertical direction. Therefore, the smallest block 21 with full programmability comprises N PLDs, which are placed underneath N×(N×M) DNDs as each PLD requires (N×M) DNDs to be fully covered.

Figure 5:
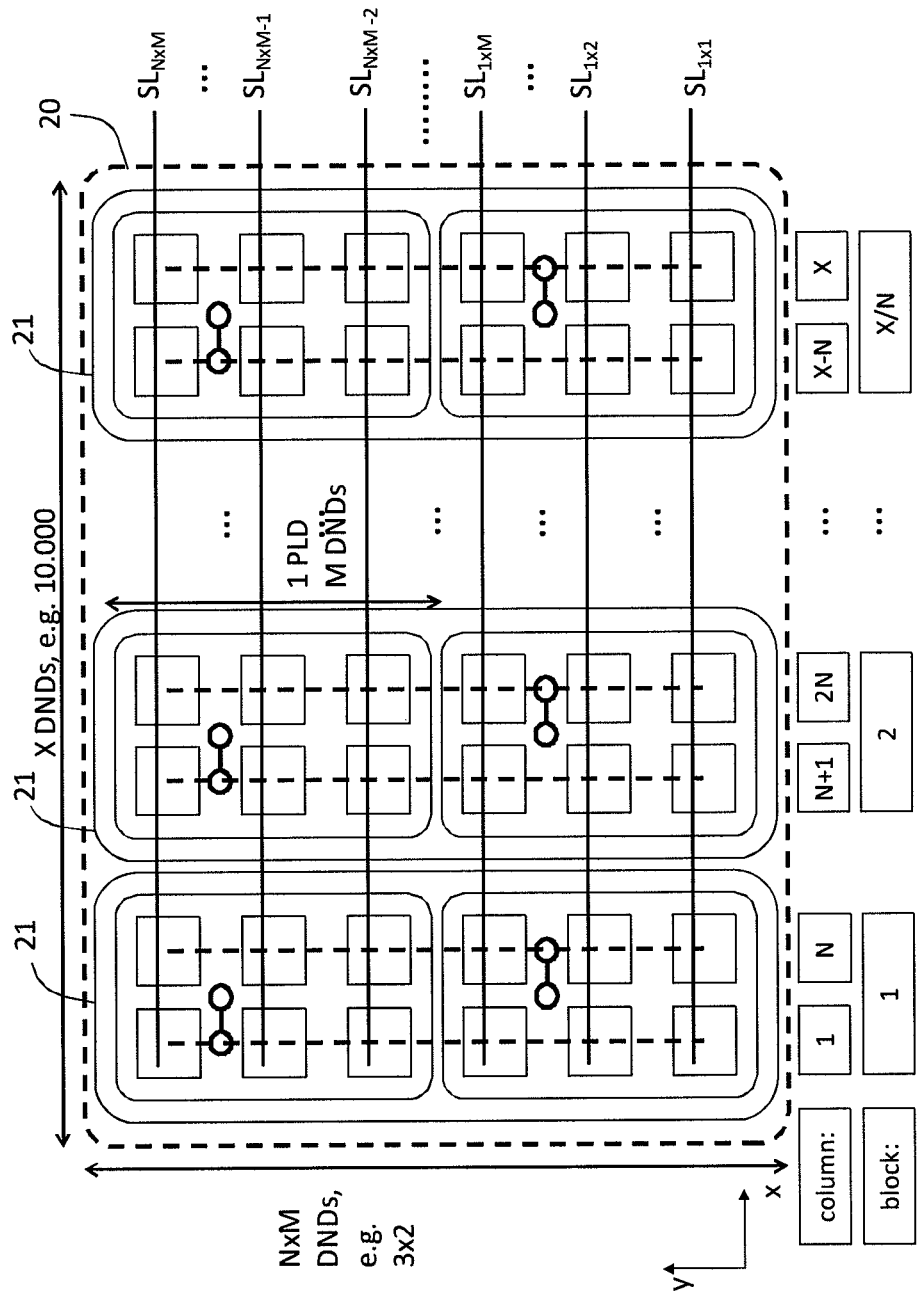
FIG. 5 illustrates a segment in accordance with one embodiment, comprising a plurality of fully programmable blocks as in FIG. 4.

FIG. 5 shows a 1D array of blocks 21 in a segment 20 of the segmented array according to one embodiment. If this segment has X columns, X PLD drivers are needed to drive all X columns. The number of blocks 21 in such a segment 20 depends on the number of DNDs needed to cover a single PLD in x-direction. If a PLD is N DNDs wide, then X/N blocks 21 with full programmability are placed on a single row to construct a segment 20. X is the number of DND columns in the segment 20 and N is the width (in number of DNDs) of a PLD. Each row of DNDs is driven by a scan line (SL). As minimal N×M DNDs are needed in one column to cover the stack of N PLDs, there will be N×M scan lines and corresponding scan line drivers (SLD) per segment 20.

Figure 6:
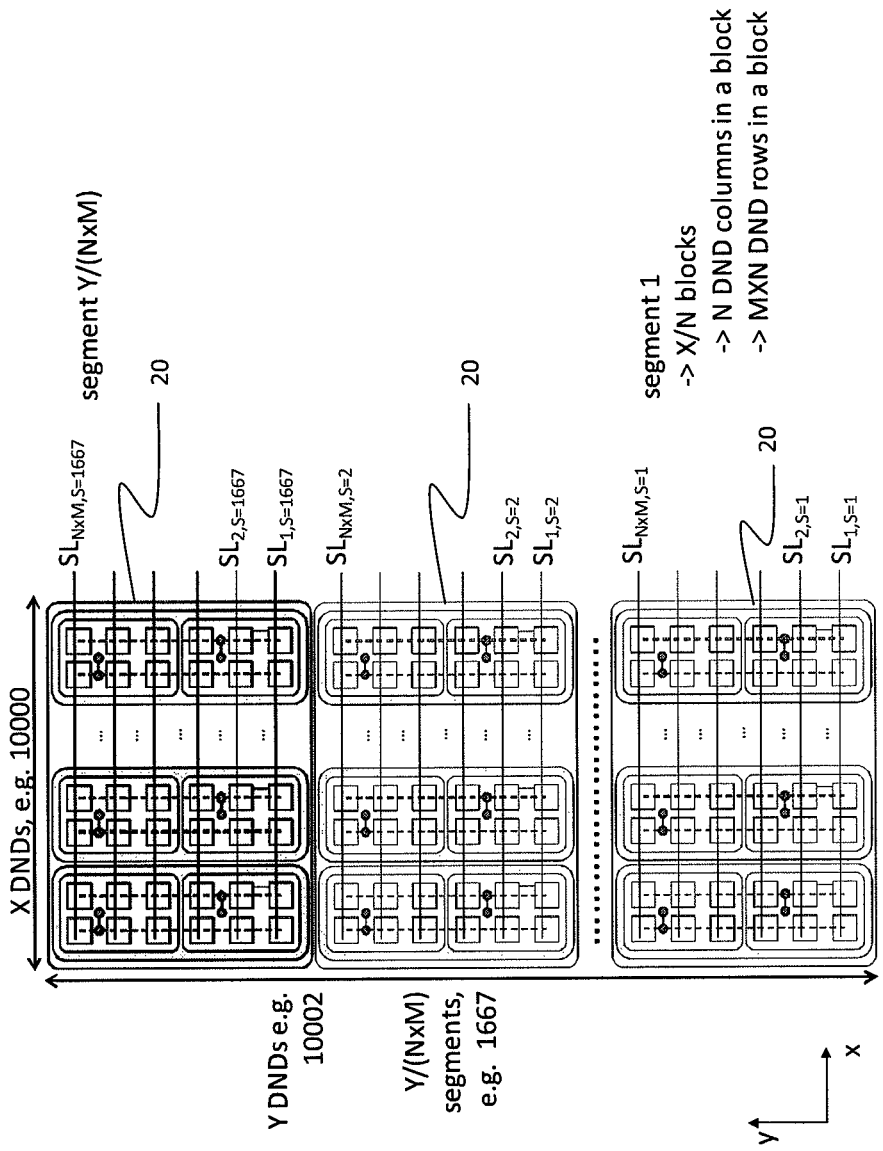
FIG. 6 illustrates a 2D array of DND elements in accordance with one embodiment, split into a plurality of segments as in FIG. 5.

FIG. 6 shows a complete 2D array according to one embodiment, composed of a plurality of segments 20, which in turn are composed of a plurality of blocks 21. To construct the full 2D array of DNDs, in accordance with one embodiment, segments 20 are stacked in the vertical direction y. If the 2D matrix has Y rows grouped in blocks 21 containing N×M rows each, then a maximal segmentation of Y/(N×M) is achieved. This is the case if the number of DNDs in a column of a block 21 (and hence of a segment 20) is the minimal number (N×M) needed to cover the stack of N DNDs in vertical direction. For such a matrix having Y DND rows, Y/(N×M) segments 20 may then be stacked in vertical direction y. Each segment 20 has its own set of LPLs and PLDs. By prefetching all data for all PLD drivers, it is possible to concurrently activate the same scan line in each of the Y/(N×M) segments 20, for example simultaneously activate the first scan lines in each of the segments 20. All DNDs on the corresponding scan line of all segments 20 will be programmed simultaneously by putting the data stored in the PLDs on the DND upon activation of the corresponding scan lines.

Figure 7:
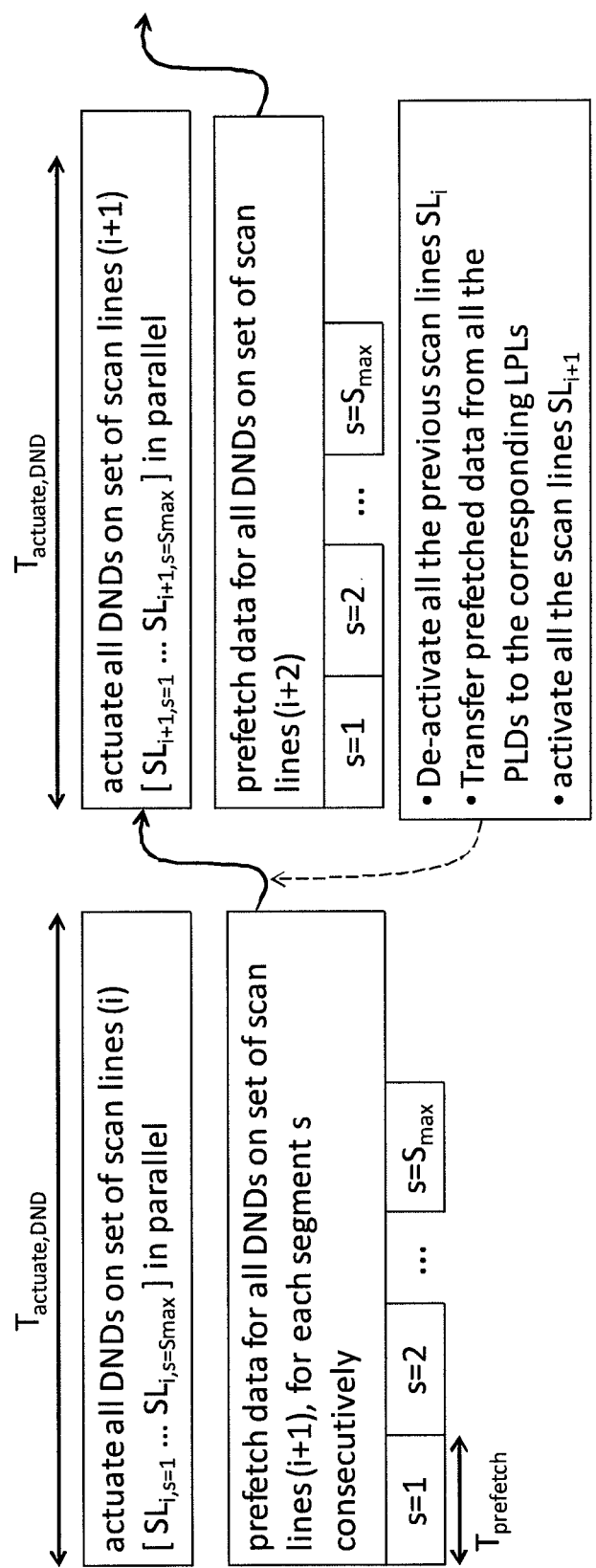
FIG. 7 illustrates a method for actuating DNDs in accordance with one embodiment.

This mechanism is illustrated by FIG. 7. A DND needs to be actuated by both its SL and LPL for a time duration "T_actuate_DND" which is determined by the MEMS design. This "T_actuate_DND" is typically in the order of microseconds. By segmenting the pixel lines into "S_max"=Y/(N×M) local pixel lines controlled by their corresponding PLD, S_max times more DNDs can be actuated in parallel, resulting in a "S_max" times higher matrix update speed. However, the data for the next row of DNDs must be available at the PLDs before the scan lines can be activated. This may be achieved by pre-fetching the data for the DNDs on the next set of scan lines (i+1) while the current set of scan lines (i) is activated and the data corresponding to the DNDs of the current set of scan lines (i) is forced onto the LPLs. Pre-fetching the data for the next set (i+1) of scan lines may be performed in parallel with actuation of the current set of scan lines (i) as follows. First, the data for the next set of scan lines (i+1) for all X LPLs of segment 1 are put on global pixel lines (GPL; indicated global bit-line in FIG. 3), whereby a GPL refers to the interconnect line that spans the entire column of the complete 2D DND array, see also FIG. 3, thereby providing the data for the PLDs of the entire column. In the embodiment illustrated in FIG. 3, there is one GPL per column of PLDs, i.e. one GPL per column of blocks. In alternative embodiments (not illustrated in the drawings), a plurality of GPLs could be routed per column of block, for example in the embodiment shown 2 GPLs per column of blocks, and the prefetch signals could be activated of 2 PLD rows in parallel.

This improves data throughput. In yet alternative embodiments (not illustrated in the drawings), less than one GPL per column could be provided Pre-fetch latches in the PLDs of a segment 20 are actuated as to sample and hold this data value. The time needed to pre-fetch data for the X LPLs of one segment 20, "T_prefetch", is typically in the order of nanoseconds. This pre-fetch is consecutively performed for each segment 20. When the actuation period of the current set of scan lines (i) is completed this set of scan lines is deactivated. When pre-fetch is completed for all segments 20 and the previous set of scan lines (i) are deactivated, the data from the PLD pre-fetch latches in all segments 20 is forced onto the LPLs and the next set of scan lines (i+1) is activated. This sequence may be repeated for each set of scan lines, from 1 to N×M.

When very high pre-fetch frequencies are needed, e.g. when faster DNDs become available or in case of a very high segmentation, the pre-fetch speed determined by the throughput on the GPL might become a limiting factor. One can for example split the GPLs in two and drive half of the segments 20 (and corresponding LPLs) from one side of the X by Y matrix, e.g. top, and drive the other half of the segments 20 (and corresponding LPLs) from the opposite side of the matrix, e.g. bottom. Splitting up the GPL allows increasing the pre-fetch parallelism with a factor of 2 while the RC time constant of GPL is divided by 4. In alternative elements, when plenty of routing resources (layers) are available, it might make sense to split the wire in four and connect the middle segments with wires to the outer side. The capacitance may be reduced, because it connects to only half as many prefetch latches. If the wire spacing is more relaxed for the "connection wires" from the edge to the middle segment, also the resistance can be reduced (wider or higher wires), and the capacitance can be reduced (larger spacing). Also a 4 times more parallelism is obtained, rather than twice.

One can choose to place Y SLDs, one for each DND row, and then activate all Y/(N×M) SLDs of a set of scan lines simultaneously. Alternatively one can choose to physically connect the scan lines of each set of scan lines (SLi,S=1 . . . SLi,S=Smax.) to a single SLD. Although the latter option requires fewer SLDs (N×M instead of Y), the reliability of the holographic system may be affected. If this single SLD fails or if there is a failure in one of the scan lines of the set, then all DNDs connected to a scan line of this set will not function.

In accordance with one embodiment, if a holographic visualization system is provided, comprising a 2D DND array with total size of X (columns)×Y(rows), the DNDs can be segmented into Y/(N×M) parallel segments 20 requiring N×M global scan-line drivers. Assuming that a single DND takes a relative area of 1×1 then a single PLD circuit takes an area of N×M DNDs. Thus, a single block 21 with full programmability takes an area of N×(N×M) DNDs (N DND columns×(N×M DND rows)). Such a block 21 contains N individual PLD circuits in one column. A single array segment 20 built from such blocks 21 has area of X(columns)× (N×M (rows)), containing X/N blocks and a total of X PLD circuits. Such single array segment 20 can be seen in FIG. 6. Each of the blocks indicated with 20 span the full DND matrix in the horizontal direction, e.g. 10K mirrors horizontally next to each other. The number of DNDs in the vertical direction in this single array segment 20 depends on the relative size of the pixel line driver PLD to DND, which determines the minimal number of DNDs per local pixel line (LPL)—as the PLD must fit under the DNDs that are served by it, which means that the DNDs connected to its LPL. Maximum segmentation, and hence maximum speed-up, of such system is equal to S=Y/(N×M), requiring only N×M global scan-line drivers (SLDs) and Y/M pixel-line drivers (PLDs) for each segment. In one embodiment, this solution has a number of advantages:

In accordance with one embodiment, very high system segmentation and speed-up of Y/(N×M) can be achieved. Considering that in practical realizations Y≅20K DNDs and N×M≅10, this corresponds to a theoretical maximum system refresh rates of 50 Hz×2000≅100 kHz, assuming a 1 MHz local DND reprogramming rate. Such system performance makes the refresh rate of 1875 Hz (of 5×5 optically-tiled holographic system) easily achievable. Further exploitation of different parameters leads to a conclusion that energy efficiency for specific level of system performance is always highest for max-segmented system working at low refresh rate, as compared to low-segmented system working at max refresh rate. This in practice means that it is always better to use the design with maximum segmentation. An additional advantage is that even if a column in such a block would fail, either by failure of the PLD, an interrupt in the LPL or by failure of a DND, this failure will only affect to a limited extent the holographic scene. The DNDs along the corresponding column of the other segments will not be affected by this local failure. Hence the reliability of such segmented 2D DND array may be increased.

In accordance with one embodiment, as each PLD only needs to drive the limited number of pixels on a LPL, lower time delay and energy consumption may be achieved.

In accordance with one embodiment, the area underneath the 2D DND array may be fully utilized by the local PLDs and no PLD area may be needed on the side of the 2D array, as compared to non-segmented solution.

In accordance with one embodiment, only N×M global SLDs may need to be located on the side of the 2D array. These SLDs may supply high bias voltage to the programmed DNDs. The scan-lines can potentially be further split into two or more segments to divide, e.g. halve, their total length and so reduce, e.g. halve, their RC delay.

In accordance with one embodiment, one might also make a full display with physically tiled DND array or with optically tiled DND array. In a physically tiled display, the I/O per MEMS might not a bottleneck, but the disclosed segmentation might allow putting all drivers underneath the pixels.

In the foregoing paragraphs, the segmentation was only exploited to position the PLDs underneath the DNDs. As will be discussed further, one can also exploit segmentation to position the SLDs, or at least part thereof, underneath the DNDs.

Figure 8:
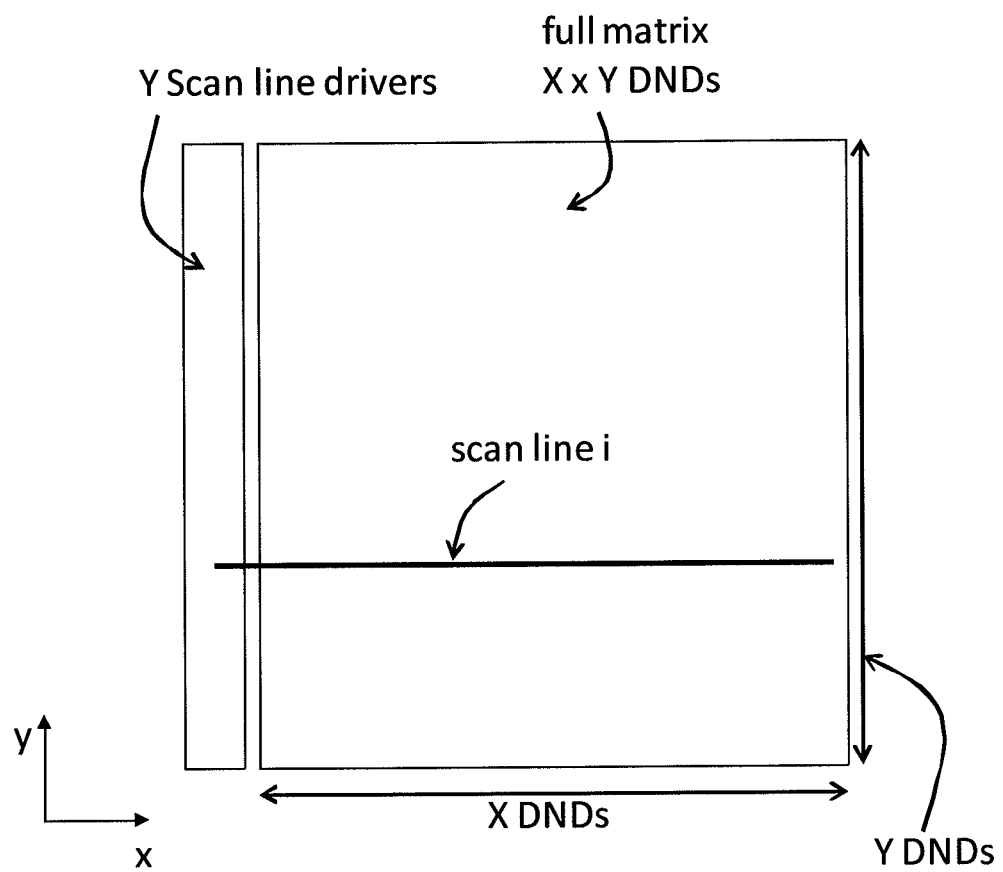
FIG. 8 illustrates a prior art array of DND elements, where scan line drivers are placed at the edge of the array.
Figure 9:
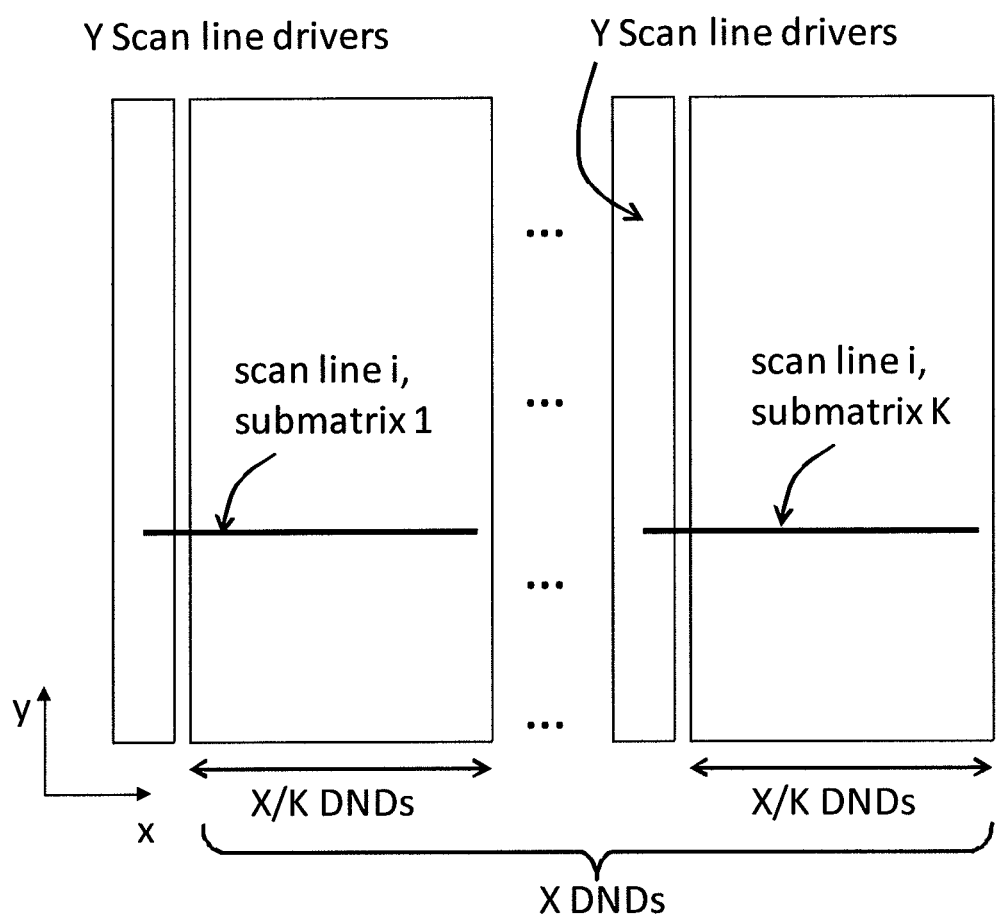
FIG. 9 illustrates an array of DND elements which is split up into a plurality of submatrices, each submatrix having its own scan line drivers arranged at the edge of the submatrix.

FIG. 8 shows a prior art 2D DND array of Y rows by X columns. In such a traditional matrix, the SLDs, as the PLDs, are positioned outside the DND array. Each scan line stretches across the width of the entire matrix. This layout not only requires additional area for placing the SLDs but, due to the long scan lines, will also result in a large RC time constant. It is known in the art that his time constant can be reduced with a factor 4 by duplicating the drivers at both sides of the matrix. As shown in FIG. 9, further improvements can be obtained by subdividing the matrix (and the segments) into K sub-matrices. Duplicates of the scan line drivers may then be inserted between the different sub-matrices to drive the rows of each sub-matrix, as shown in FIG. 9. All DNDs in one row of such a sub-matrix are then connected to a corresponding SLD by a local scan line (LSL). All duplicates of a SLD are activated concurrently in order to activate all DNDs in one row of the complete matrix. However, this way of subdividing the matrix has the disadvantage that it results in gaps in the array of DNDs and in an increase of the area of the system.

In accordance with one embodiment, if all scan line drivers can be put underneath the DND array, the RC time constant of the scan lines can be reduced by this division along the horizontal direction without introducing gaps in the DND array.

Figure 10:
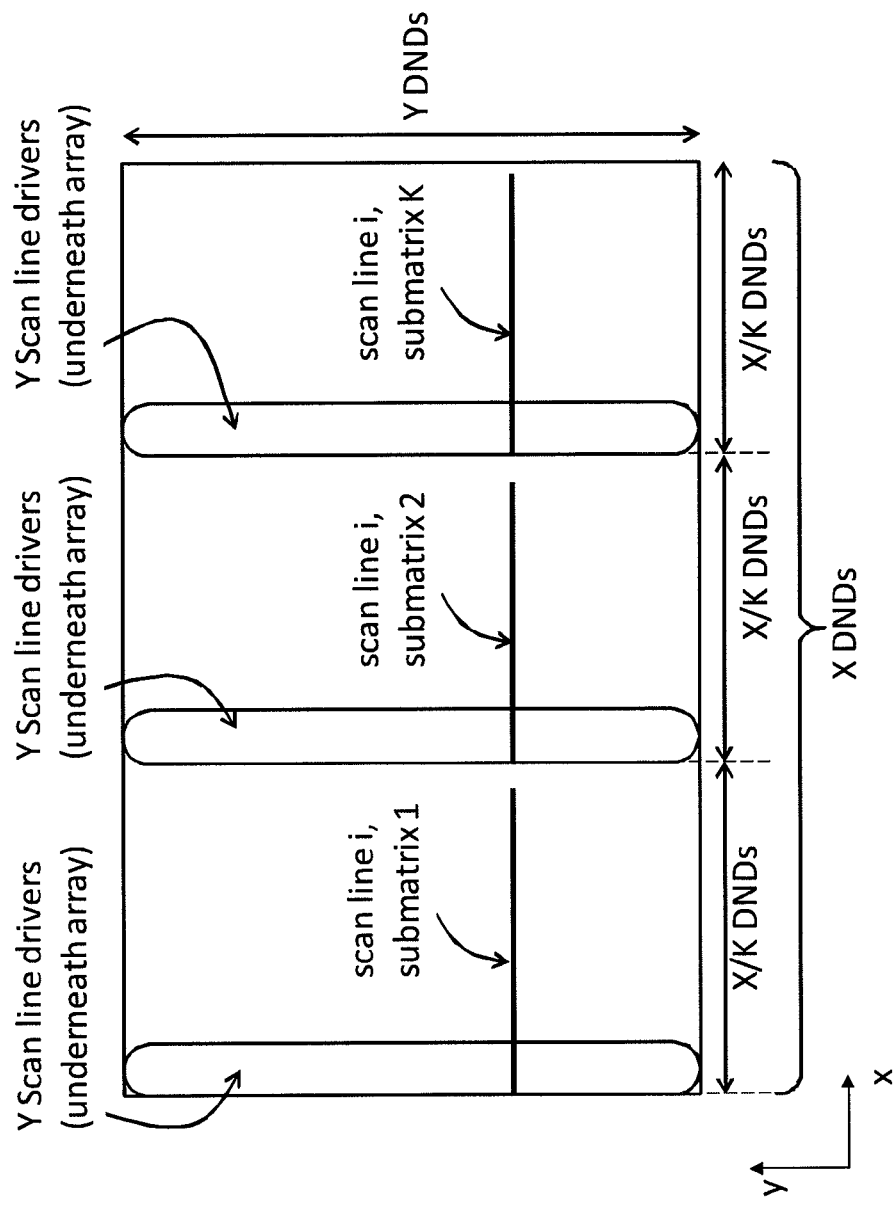
FIG. 10 illustrates an array of DND elements which is split up into a plurality of submatrices, each submatrix having its own scan line drivers arranged underneath the submatrix in accordance with one embodiment.

In FIG. 10, showing a full array of X by Y DNDs, duplicate SLDs are placed underneath the DND array of each of the X/K sub-matrices. This requires that both the PLDs and SLDs are covered by DNDs they serve. As both the SLDs and the PLDs have to be placed underneath the DND array they serve, there is less space available to place the SLDs. If the number of DNDs per local pixel lines (LPLs) (and hence per PLD) is increased, the area underneath the additional DNDs that are now served by the PLDs can be used to place the SLDs. Hence, instead of using the minimal block size of N×(N×M) DNDs that is needed for covering the corresponding PLDs as illustrated in FIG. 4, the area of a block 21 (and hence the height of the segment 20) can be increased in order to create sufficient area underneath the DNDs to accommodate for both the SLDs and the PLDs. As the length of the LPLs is increased, the segment height increases. This reduces the number of segments and hence the maximal update frequency of the matrix.

Figure 11:
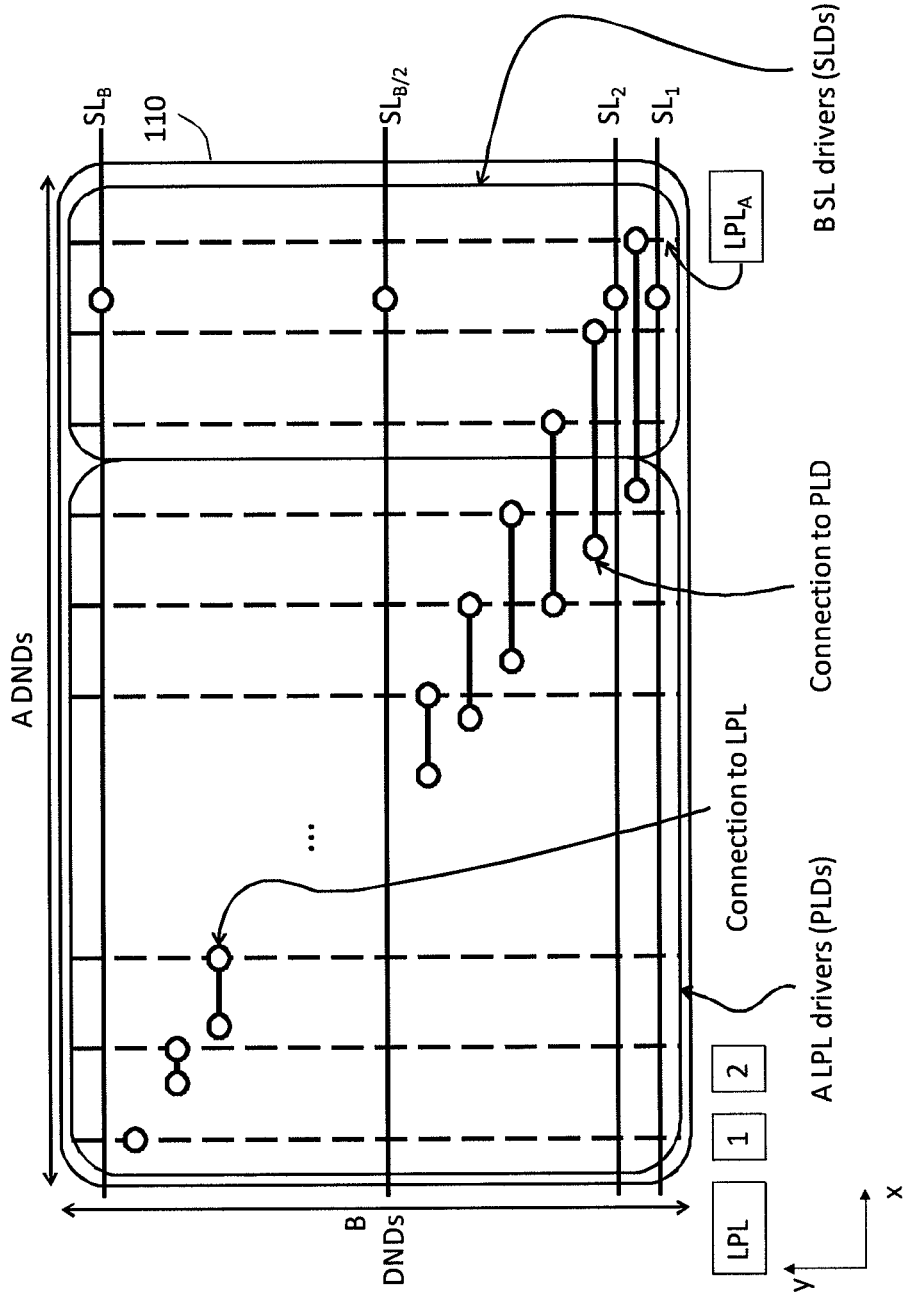
FIG. 11 illustrates an implementation according to one embodiment, wherein both pixel line drivers and scan line drivers are arranged side by side underneath the DND elements they serve.

FIG. 11 shows a layout that allows the SLDs to be placed underneath the 2D array of DNDs. Scan line drivers (SLDs) can be placed underneath the sub-matrix of DNDs by using interconnect resources to connect each PLD to the corresponding LPL. If at least B SLDs and A PLDs can be fit underneath a matrix of A DND columns (requiring A PLDs)×B DND rows (requiring B SLDs), this block 110 can provide full programmability and at the same time accommodate the SLDs and PLDs underneath the DND matrix. The number of A columns and B rows can be determined in view of the unit area of a PLD and SLDs and the number of DNDs needed to cover such a PLD or SLD as discussed in the previous paragraphs illustrated by FIG. 2 to FIG. 6 when segmenting the 2D array of X by Y DNDs in vertical direction only. In this respect, A may preferably be determined as large as possible, while still realizing an acceptable time constant RC for the scan lines SL, e.g. A=X/4. Then B may be determined such that it is possible to fit A PLDs and B SLDs underneath A×B DNDs. The width of a SLD determines the additional number of columns. This number in turns determines the additional number of PLDs needed to drive these additional columns. The additional number of PLDs determines the additional number of rows to be added in order to provide area for these additional PLDs. Although the minimal LPL length of N×M DNDs as shown in FIG. 4 and hence the corresponding maximal matrix refresh frequency cannot be achieved, one gains in time delay of the scan lines and in area required by the SLD.

In this approach, preferably first segmentation in vertical direction may be done in view of maximum refresh rate. If needed, the SLD can be inserted underneath the 2D DND array. This will require a recalculation of the number of vertical segments and of blocks therein as DNDs are allocated to accommodate for the SLDs and because of the repositioning of the PLDs driving these allocated DNDs. In this approach the SL can be easily connected to the corresponding SLD. However, a more complex rerouting of the pixel lines might be required. As area of a given 2D array remains fixed: X columns×Y rows, more DNDs may be stacked, resulting in less segments in y direction. Within a segment, some blocks might have their SLD underneath while their corresponding PLD can be stacked in other blocks thanks to the enlarged segment height.

Figure 12:
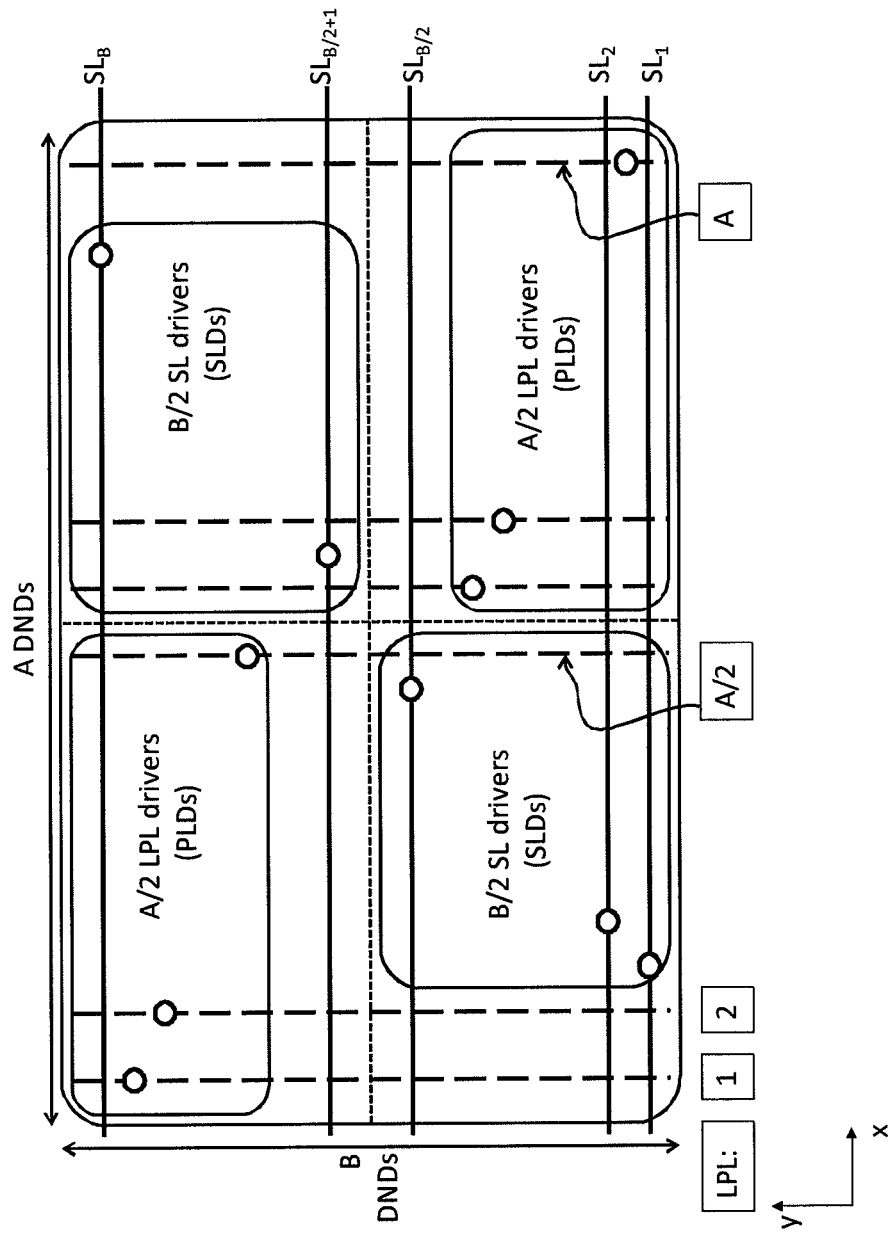
FIG. 12 illustrates an implementation according to one embodiment, wherein both pixel line drivers and scan line drivers are arranged in a checkerboard pattern underneath the DND elements they serve.

FIG. 12 shows an alternative layout allowing the SLD to be placed underneath the 2D array of X by Y DNDs. Scan line drivers (SLDs) can be placed underneath the matrix of DNDs using a checkerboard pattern. If at least B SLDs and A PLDs can fit underneath a matrix of A DND columns×B DND rows, this block can provide full programmability and at the same time accommodate the SLDs underneath the DND matrix. In this example B/2 SLDs are positioned at the bottom right of the A×B DND matrix, while the other B/2 SLDs are positioned at the top left of the A×B DND matrix.

One of the ways to do this division is to dedicate sub-blocks of SLDs along the diagonal of a block. The block width A may be determined as large as possible as acceptable by SL RC delay and as useful to reduce total SLD area. One can make smaller groups of SLDs and distribute them along the width of the array such that these groups of SLDs do not overlap in horizontal direction.

The advantage of this checkerboard pattern compared to the layout illustrated by FIG. 11 is that no additional routing resources are needed to connect the SLDs to the SLs and to connect the PLDs to the LPLs. In the example illustrated by FIG. 12, the height of the block (and of the segment) is increased to accommodate the SLD. By distributing groups of SLDs over the width of the segment, one can ensure that all LPLs are connected to PLD in the column as LPLs are routed vertically. Likewise the local scan lines (LSL) are connected to a SLD in the same row as all LSLs are routed horizontally. FIG. 13 gives a detailed example of such checkerboard pattern. In this example each PLD requires N×M DNDs, a SLD requires 1×N DNDs. Here A=2 N and B=2 (N×M). In this checkerboard layout, one can ensure that each LPL runs over its corresponding PLD and that each LSL runs over its corresponding SLD, ensuring an easy routing of both LSL and LPL.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments, but only to the claims.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. A digital nanomirror device (DND) chip comprising:
  a 2D DND array of DND elements logically arranged in rows and columns; and
  a DND driver configured to actuate the DND elements, the DND driver comprising a set of first drive lines along the rows of DND elements, a set of second drive lines along the columns of DND elements, a set of first line drivers each configured to bias one of the first drive lines, and a set of second line drivers each configured to bias one of the second drive lines, wherein a plurality of the second line drivers are spatially grouped together to serve a block of the DND elements, and wherein the plurality of second line drivers are spatially covered substantially completely by at least some DND elements of the block of DND elements.

2. A DND chip according to claim 1, wherein one of the second line drivers has a width of N DND elements and a height of M DND elements, N of the second line drivers being grouped together to serve a block of N×(N×M) DND elements.

3. A DND chip according to claim 1, wherein a plurality of blocks of DND elements each covering the plurality of second line drivers serving the DNDs of their block, are arranged adjacent to one another in the row direction.

4. A DND chip according to claim 3, wherein a plurality of blocks arranged adjacent to one another are grouped together for all to be served by the same plurality of first line drivers.

5. A DND chip according to claim 4, wherein the first drive lines are arranged for driving all DND elements on a row of the array.

6. A DND chip according to claim 4, wherein at least two of the first drive lines are arranged for each driving a different set of DND elements on a row.

7. A DND chip according to claim 1, wherein a plurality of the first line drivers are spatially grouped together to serve a block of DND elements, and wherein the plurality of first line drivers are spatially covered substantially completely by at least some DND elements of the block of DND elements.

8. A DND chip according to claim 7, wherein the first line drivers and the second line drivers together are covered by all DNDs they serve.

9. A DND chip according to claim 7, wherein the first line drivers and the second line drivers are placed underneath the DNDs they serve in a checkerboard pattern.

10. A DND chip according to claim 1, further comprising routing resources to connect the first line drivers to the first drive lines and/or to connect the second line drivers to the second drive lines.

11. A DND chip according to claim 1, wherein the DND elements have width and height dimensions not larger than about 1 μm.

12. A holographic visualization system comprising a DND chip according to claim 1.

13. A method of manufacturing a digital nanomirror device (DND) chip, the method comprising:

forming a 2D DND array of DND elements logically arranged in rows and columns; and forming a DND driver configured to actuate the DND elements, the DND driver comprising a set of first drive lines along the rows of DND elements, a set of second drive lines along the columns of DND elements, a set of first line drivers each configured to bias one of the first drive lines, and a set of second line drivers each configured to bias one of the second drive lines, wherein a plurality of the second line drivers are spatially grouped together to serve a block of the DND elements, and wherein the plurality of second line drivers are spatially covered substantially completely by at least some DND elements of the block of DND elements.

14. The method according to claim 13, wherein one of the second line drivers has a width of N DND elements and a height of M DND elements, N of the second line drivers being grouped together to serve a block of N×(N×M) DND elements.

15. The method according to claim 13, wherein a plurality of blocks of DND elements each covering the plurality of second line drivers serving the DNDs of their block, are arranged adjacent to one another in the row direction.

16. The method according to claim 13, wherein a plurality of the first line drivers are spatially grouped together to serve a block of DND elements, and wherein the plurality of first line drivers are spatially covered substantially completely by at least some DND elements of the block of DND elements.

17. The method according to claim 16, wherein the first line drivers and the second line drivers together are covered by all DNDs they serve.

18. The method according to claim 13, further comprising forming routing resources to connect the first line drivers to the first drive lines and/or to connect the second line drivers to the second drive lines.

19. The method according to claim 16, wherein the first line drivers and the second line drivers are placed underneath the DNDs they serve in a checkerboard pattern.

20. The method according to claim 13, wherein the DND elements have width and height dimensions not larger than about 1 μm.

* * * * *